US007375683B2

(12) United States Patent
Smith et al.

(10) Patent No.: US 7,375,683 B2
(45) Date of Patent: May 20, 2008

(54) USE OF GEO-STATIONARY SATELLITES TO AUGMENT WIDE_ AREA MULTILATERATION SYNCHRONIZATION

(75) Inventors: Alexander E. Smith, McLean, VA (US); Thomas J. Breen, Tyngsboro, MA (US)

(73) Assignee: ERA Systems Corporation, Reston, VA (US)

( * ) Notice: Subject to any disclaimer, the term of this patent is extended or adjusted under 35 U.S.C. 154(b) by 3 days.

(21) Appl. No.: 11/343,079

(22) Filed: Jan. 30, 2006

(65) Prior Publication Data

US 2007/0001903 A1 Jan. 4, 2007

Related U.S. Application Data

(60) Continuation-in-part of application No. 10/457,439, filed on Jun. 10, 2003, now Pat. No. 6,885,340, and a continuation-in-part of application No. 09/971,672, filed on Oct. 9, 2001, now Pat. No. 6,567,043, which is a division of application No. 09/516,215, filed on Feb. 29, 2000, now Pat. No. 6,633,259, said application No. 10/457,439 and a continuation-in-part of application No. 10/319,725, filed on Dec. 16, 2002, now Pat. No. 6,812,890, application No. 11/343,079, and a continuation-in-part of application No. 10/743, 042, filed on Dec. 23, 2003, now Pat. No. 7,132,982, is a continuation-in-part of application No. 10/638, 524, filed on Aug. 12, 2003, now Pat. No. 6,806,829, which is a continuation of application No. 09/516, (Continued)

(60) Provisional application No. 60/440,618, filed on Jan. 17, 2003, provisional application No. 60/123,170, filed on Mar. 5, 1999, provisional application No. 60/343,237, filed on Dec. 31, 2001, provisional application No. 60/534,706, filed on Jan. 8, 2004.

(51) Int. Cl.
*G01S 3/02* (2006.01)
*G01S 1/24* (2006.01)
(52) U.S. Cl. ...................................... 342/387; 342/465
(58) Field of Classification Search ........... 342/357.01, 342/357.06, 387, 456–457, 463, 465; 455/456.2, 455/456.6
See application file for complete search history.

(56) References Cited

U.S. PATENT DOCUMENTS 1,738,571 A  12/1929  Gare ........................... 404/18

(Continued)

FOREIGN PATENT DOCUMENTS

JP  9-288175 A  11/1994

(Continued)

OTHER PUBLICATIONS

Traffic Alert System Technical Design Summary, Final Report, Apr. 1994 (Baldwin et al.).

(Continued)

*Primary Examiner*—Dao Phan
(74) *Attorney, Agent, or Firm*—Robert Platt Bell

(57) ABSTRACT

The present invention improves WAMLAT Timing Availability by using timing from one or more of a variety of sources. These sources include unaugmented SATNAV timing, from GPS or/and GALILEO, GEO timing from pseudo SATNAV signals, additional GEO timing for non SATNAV applications, timing derived from both terrestrial and satellite television and radio transmissions, and stable on board oscillators to withstand short term interruptions in satellite timing. The use of one or more of these multiple sources of timing improves accuracy and reliability of wide area multilateration systems.

12 Claims, 8 Drawing Sheets

Related U.S. Application Data 215, said application No. 10/743,042 and a continuation-in-part of application No. 10/319,725, filed on Dec. 16, 2002, now Pat. No. 6,812,890, application No. 11/343,079, and a continuation-in-part of application No. 11/031,457, filed on Jan. 7, 2005, is a continuation-in-part of application No. 10/638,524, filed on Aug. 12, 2003, now Pat. No. 6,806,829, which is a continuation of application No. 09/516,215, said application No. 11/031,457 and a continuation-in-part of application No. 10/319,725, filed on Dec. 16, 2002, now Pat. No. 6,812,890, application No. 11/343,079, and a continuation-in-part of application No. 10/756,799, filed on Jan. 14, 2004, now Pat. No. 7,126,534, is a continuation-in-part of application No. 10/638,524, filed on Aug. 12, 2003, now Pat. No. 6,806,829, which is a continuation of application No. 09/516,215, said application No. 10/756,799 and a continuation-in-part of application No. 10/319,725, filed on Dec. 16, 2002, now Pat. No. 6,812,890, , said application No. 10/756,799 and a continuation-in-part of application No. 10/751,118, filed on Jan. 5, 2004, now abandoned, , said application No. 10/756,799 and a continuation-in-part of application No. 10/743,042, filed on Dec. 23, 2003, now Pat. No. 7,132,982, and a continuation-in-part of application No. 10/457,439, filed on Jun. 10, 2003, now Pat. No. 6,885,340, application No. 11/343,079, and a continuation-in-part of application No. 10/830,444, filed on Apr. 23, 2004, now Pat. No. 7,123,192, is a division of application No. 10/457,439, filed on Jun. 10, 2003, and a continuation-in-part of application No. 09/516,215, and a continuation-in-part of application No. 10/319,725, filed on Dec. 16, 2002, now Pat. No. 6,812,890, application No. 11/343,079, and a continuation-in-part of application No. 11/111,957, filed on Apr. 22, 2005, and a continuation-in-part of application No. 11/145,170, filed on Jun. 6, 2005, and a continuation-in-part of application No. 11/203,823, filed on Aug. 15, 2005, and a continuation-in-part of application No. 11/257,416, filed on Oct. 24, 2005, and a continuation-in-part of application No. 11/209,030, filed on Aug. 22, 2005.

(56) References Cited

U.S. PATENT DOCUMENTS

| | | | | |
|---|---|---|---|---|
| 3,668,403 | A | 6/1972 | Meilander | 701/121 |
| 3,705,404 | A | 12/1972 | Chisholm | 343/112 R |
| 3,792,472 | A | 2/1974 | Payne et al. | 342/32 |
| 4,079,414 | A | 3/1978 | Sullivan | 725/114 |
| 4,122,522 | A | 10/1978 | Smith | 701/15 |
| 4,167,006 | A | 9/1979 | Funatsu et al. | 343/6.5 LC |
| 4,196,474 | A | 4/1980 | Buchanan et al. | 364/461 |
| 4,224,669 | A | 9/1980 | Brame | 701/8 |
| 4,229,737 | A | 10/1980 | Heldwein et al. | 343/6 R |
| 4,293,857 | A | 10/1981 | Baldwin | 343/6.5 |
| 4,327,437 | A | 4/1982 | Frosch et al. | 714/3 |
| 4,359,733 | A | 11/1982 | O'Neill | 342/36 |
| 4,454,510 | A | 6/1984 | Crow | 343/5 |
| 4,524,931 | A | 6/1985 | Nilsson | 246/167 |
| 4,646,244 | A | 2/1987 | Bateman | 701/301 |
| 4,688,046 | A | 8/1987 | Schwab | 342/456 |
| 4,782,450 | A | 11/1988 | Flax | 364/461 |
| 4,811,308 | A | 3/1989 | Michel | 367/136 |
| 4,899,296 | A | 2/1990 | Khattak | 702/40 |
| 4,914,733 | A | 4/1990 | Gralnick | 340/961 |
| 5,075,694 | A | 12/1991 | Donnangelo et al. | 342/455 |
| 5,144,315 | A | 9/1992 | Schwab et al. | 342/49 |
| 5,153,836 | A | 10/1992 | Fraughton et al. | 364/461 |
| 5,191,342 | A | 3/1993 | Alsup et al. | 342/465 |
| 5,260,702 | A | 11/1993 | Thompson | 340/970 |
| 5,262,784 | A | 11/1993 | Drobnicki et al. | 342/45 |
| 5,268,698 | A | 12/1993 | Smith et al. | 342/450 |
| 5,283,574 | A | 2/1994 | Grove | 340/970 |
| 5,317,316 | A | 5/1994 | Sturm et al. | 342/30 |
| 5,365,516 | A | 11/1994 | Jandrell | 370/18 |
| 5,374,932 | A | 12/1994 | Wyschogrod et al. | 342/36 |
| 5,381,140 | A | 1/1995 | Kuroda et al. | 340/961 |
| 5,402,116 | A | 3/1995 | Ashley | 340/870.1 |
| 5,454,720 | A | 10/1995 | FitzGerald et al. | 434/27 |
| 5,506,590 | A | 4/1996 | Minter | 342/462 |
| 5,528,244 | A | 6/1996 | Schwab | 342/37 |
| 5,570,095 | A | 10/1996 | Drouilhet, Jr. et al. | 342/456 |
| 5,596,326 | A | 1/1997 | Fitts | 342/30 |
| 5,596,332 | A | 1/1997 | Coles et al. | 342/455 |
| 5,627,546 | A | 5/1997 | Crow | 342/352 |
| 5,629,691 | A | 5/1997 | Jain | 340/961 |
| 5,666,110 | A | 9/1997 | Paterson | 340/970 |
| 5,680,140 | A | 10/1997 | Loomis | 342/357 |
| 5,714,948 | A | 2/1998 | Farmakis et al. | 340/961 |
| 5,752,216 | A | 5/1998 | Carlson et al. | 701/120 |
| 5,774,829 | A | 6/1998 | Cisneros et al. | 701/213 |
| 5,781,150 | A | 7/1998 | Norris | 342/357 |
| 5,798,712 | A | 8/1998 | Coquin | 340/970 |
| 5,839,080 | A | 11/1998 | Muller | 701/9 |
| 5,867,804 | A | 2/1999 | Pilley et al. | 701/120 |
| 5,884,222 | A | 3/1999 | Denoize et al. | 701/301 |
| 5,890,068 | A * | 3/1999 | Fattouche et al. | 455/456.2 |
| 5,999,116 | A | 12/1999 | Evers | 342/36 |
| 6,049,304 | A | 4/2000 | Rudel et al. | 342/357.08 |
| 6,085,150 | A | 7/2000 | Henry et al. | 701/301 |
| 6,088,634 | A | 7/2000 | Muller | 701/9 |
| 6,092,009 | A | 7/2000 | Glover | 701/14 |
| 6,094,169 | A | 7/2000 | Smith et al. | 342/465 |
| 6,122,570 | A | 9/2000 | Muller | 701/9 |
| 6,127,944 | A | 10/2000 | Daly | 340/963 |
| 6,133,867 | A | 10/2000 | Eberwine et al. | 342/29 |
| 6,134,228 | A * | 10/2000 | Cedervall et al. | 370/335 |
| 6,138,060 | A | 10/2000 | Conner | 701/9 |
| 6,201,499 | B1 * | 3/2001 | Hawkes et al. | 342/387 |
| 6,208,284 | B1 | 3/2001 | Woodell et al. | 342/30 |
| 6,211,811 | B1 | 4/2001 | Evers | 342/36 |
| 6,219,592 | B1 | 4/2001 | Muller et al. | 701/9 |
| 6,292,721 | B1 | 9/2001 | Conner et al. | 701/9 |
| 6,311,127 | B1 | 10/2001 | Stratton et al. | 701/213 |
| 6,314,363 | B1 | 11/2001 | Pilley et al. | 701/120 |
| 6,347,263 | B1 | 2/2002 | Johnson et al. | 701/14 |
| 6,380,870 | B1 | 4/2002 | Conner et al. | 340/970 |
| 6,384,783 | B1 | 5/2002 | Smith et al. | 342/387 |
| 6,445,310 | B1 | 9/2002 | Bateman et al. | 340/970 |
| 6,448,929 | B1 | 9/2002 | Smith et al. | 342/456 |
| 6,463,383 | B1 | 10/2002 | Baiada et al. | 701/120 |
| 6,469,664 | B1 | 10/2002 | Michaelson et al. | 342/357.13 |
| 6,477,449 | B1 | 11/2002 | Conner et al. | 701/4 |
| 6,567,043 | B2 | 5/2003 | Smith et al. | 342/450 |
| 6,571,155 | B2 | 5/2003 | Carriker et al. | 701/3 |
| 6,584,414 | B1 | 6/2003 | Green et al. | 702/33 |
| 6,606,034 | B1 | 8/2003 | Muller et al. | 340/970 |
| 6,615,648 | B1 | 9/2003 | Ferguson et al. | 73/146 |
| 6,633,259 | B1 | 10/2003 | Smith et al. | 342/456 |
| 6,691,004 | B2 | 2/2004 | Johnson | 701/14 |
| 6,707,394 | B2 | 3/2004 | Ishihara et al. | 340/970 |
| 6,710,723 | B2 | 3/2004 | Muller | 340/970 |
| 6,750,815 | B2 | 6/2004 | Michaelson et al. | 342/357.13 |
| 6,789,011 | B2 | 9/2004 | Baiada et al. | 701/120 |
| 6,812,890 | B2 | 11/2004 | Smith et al. | 342/454 |
| 6,873,903 | B2 | 3/2005 | Baiada et al. | 701/120 |
| 6,885,340 | B2 | 4/2005 | Smith et al. | 342/465 |
| 6,927,701 | B2 | 8/2005 | Schmidt et al. | 340/959 |

| | | | | |
|---|---|---|---|---|
| 6,930,638 | B2 | 8/2005 | Lloyd et al. | 342/453 |
| 6,992,626 | B2 | 1/2006 | Smith | 342/454 |
| 7,123,169 | B2 | 10/2006 | Farmer et al. | 340/945 |
| 7,123,192 | B2 | 10/2006 | Smith et al. | 342/455 |
| 7,126,534 | B2 | 10/2006 | Smith et al. | 342/456 |
| 7,142,154 | B2 | 11/2006 | Quilter et al. | 342/357.06 |
| 2001/0026240 | A1 | 10/2001 | Neher | 342/357.07 |
| 2002/0021247 | A1 | 2/2002 | Smith et al. | 342/450 |
| 2002/0089433 | A1 | 7/2002 | Bateman et al. | 340/970 |
| 2003/0009267 | A1 | 1/2003 | Dunsky et al. | 701/4 |
| 2004/0004554 | A1 | 1/2004 | Srinivasan et al. | 340/870.01 |
| 2004/0225432 | A1 | 11/2004 | Pilley et al. | 701/117 |
| 2005/0021283 | A1 | 1/2005 | Brinton et al. | 702/150 |
| 2005/0046569 | A1 | 3/2005 | Spriggs et al. | 340/551 |
| 2006/0276201 | A1* | 12/2006 | Dupray | 455/465.1 |

FOREIGN PATENT DOCUMENTS

| | | |
|---|---|---|
| JP | 6-342061 A | 12/1994 |
| JP | 8-146130 A | 5/1996 |
| JP | 9-119983 A | 11/1996 |
| WO | WO 94/14251 | 6/1994 |
| WO | WO 99/50985 | 10/1999 |

OTHER PUBLICATIONS

GPS Relative Accuracy for Collision Avoidance, Institute of Navigation Technical Meeting, Jan. 1997 (Rudel et al.).
Cassell, R., Smith A., Cohen, B., Yang, E., Sleep, B., A Prototype Aircraft Performance Risk Assessment Model, Final Report, Rannoch Corporation, Feb. 28, 2002.
Cassell, R., Smith A., Cohen, B., Yang, E., Sleep, B., Esche, J., Aircraft Performance Risk Assessment Model (APRAM), Rannoch Corporation, Nov. 30, 2002.
Cox, E., A., Fuzzy Logic For Business and Industry, Charles River Media, 1995, Chapter 5.
Smith, A., Cassell, R., Cohen, B., An approach to Aircraft Performance Risk Assessment Modeling, Final Report, Rannoch Corporation, Mar. 1999.
M.L. Wood and R.W. Bush, "Multilateration on Mode S and ATCRBS Signals at Atlanta's Hartsfield Airport", Lincoln Laboratory, M.I.T., Jan. 8, 1998.
AERMOD: Description of Model Formulation (Version 02222) EPA 454/R-02-002d, Oct. 21, 2002.
FAA Integrated Noise Model, www.faa.gov, current release INM 6.1 (Mar. 4, 2003).
"Flight Explorer News: Flight Explorer and Lochard Team to Provide Enhanced Flight Tracking for Customers Worldwide", Apr. 28, 2003, http://www.flightexplorer/com/News/press%20releases/pr042803.asp.
Source Code received by Rannoch Corp. from FAA, circa 1998.
"A Routine that converts an American Mode S address into its corresponding 'N' number string", Ken Banis, Feb. 17, 1992.
"Description of the U.S. Algorithm for Assigning Mode A Addresses", Robert D. Grappel, M.I.T. Lincoln Laboratory, Nov. 1991.
"Program to convert Mode S address to U.S. Tail Number", R.D. Grappel, M.I.T. Lincoln Laboratory, 1991.
"Program to convert U.S. aircraft tail numbers to Mode S code", R.D. Grappel, M.I.T. Lincoln Laboratory, 1991.
"ADSE and Multilateration Mode-S Data Fusion for Location and Identification on Airport Surface", J.G. Herraro J.A. Portas, F.J. Rodriguez, (IEEE 1999 Radar Conference Proceedings, pp. 315-320, Apr. 20-22, 1999).
D.C. Rickard, D.J. Sherry, S.J. Taylor, "The development of a prototype aircraft-height monitoring unit utilising an SSR-based difference in time of arrival technique", International Conference Radar 92 (Conf. Publ. No. 365), 1992, p. 250-3.
D. E. Manolakis and C. C. Lefas, "Aircraft geometric height computation using secondary surveillance radar range differences," IEE Proceedings-F, Radar, Sonar, Navigation, vol 141, No. 2, pp. 139-148, 1994.

Request for Proposal for Acquisition of Airport Noise and Operations Monitoring System (NOMS), Indianapolis Airport Authority, Oct. 21, 2003.
Technical Specifications, for Aircraft Flight Track and Noise Management System for the Regional Airport Authority of Louisville and Jefferson County, Harris Miller, Miller & Hanson Inc. 15 New England Executive Park Burlington, MA 01803 HMMH Report No. 298950, May 16, 2003.
"Overview of the FAA ADS-B Link Decision", John Scardina, Director, Office of System Architecture and Investment Analysis, Federal Aviation Administration, Jun. 7, 2002.
"Ground-Based Transceiver (GBT) For Broadcast Services Using the Universal Access Transceiver (UAT) Data Link", FAA-E-2973, Department of Transportation, Federal Aviation Administration, Jan. 15, 2004.
"Wide Area Multilateration Report on EATMP TRS 131/04 Version 1.1", NLR-CR-2004-472, Roke Manor, Nov. 2004.
J.G. Herrero, J. A. B. Portas, F.J.J. Rodriguez, J.R.C. Corredera, ASDE and Multilateration Mode-S Data Fusion for Location and Identification on Airport Surface, (IEEE 1999 Radar Conf. Proc., pp. 315-320, Apr. 20-22, 1999).
D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.
D. E. Manolakis and C. C. Lefas, Aircraft geometric height computation using secondary surveillance radar range differences,☐ IEE Proceedings-F, Radar, Sonar, Navigation, vol. 141, No. 2, pp. 139-148, 1994.
GPS Risk Assessment Study, Final Report, T.M. Corrigan et al., Johns Hopkins Univ., Applied Physics Laboratory, Jan. 1999.
Aircraft Noise Report, vol. 17, No. 1, Jan. 31, 200.
ASA MASPS—Change Issue, James Maynard, Oct. 21, 2002.
ADS-B, Automatic Dependent Surveillance—Broadcast Will ADS-B Increase Safety and Security for Aviation?, Mar. 1999, revised Jul. 2000, Darryl H. Phillips AirSport Corporation, 1100 West Cherokee Sallisaw OK 74955.
ASA MASPS—Change Issue, Greg Stayton, Aug. 1, 2002.
ASA MASPS—Change Issue, Michael Petri, Oct. 23, 2002.
ASA MASPS—Change Issue, J. Stuart Searight, Nov. 18, 2002.
ASA MASPS—Change Issue, Michael Petri, Dec. 16, 2002.
ASA MASPA—Change Issue, J. Stuart Searight, Jan. 23, 2003.
ASA MASPS—Change Issue, Tony Warren, Feb. 3, 2003.
ASA MASPS—Change Issue, Steve George, Apr. 23, 2003.
ASA MASPS—Change Issue, James Maynard, Apr. 23, 2003.
ASA MASPS—Change Issue, T.E. Foster, Jun. 11, 2003.
ASA MASPS—Change Issue, Jonathan Hammer et al., Jan. 13, 2004.
ASA MASPS—Change Issue, Tom Mosher, Jan. 13, 2004.
ASA MASPS—Change Issue, Mike Castle, Feb. 13, 2004.
ASA MASPS—Change Issue, Tony Warren, Sep. 10, 2004.
ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA MASPS—Change Issue, Taji Shafaat, Sep. 19, 2004.
ASA MASPS—Change Issue, Stuart Searight, Nov. 3, 2004.
A Radar Substitute—David Hughes, Aviation Week & Space Technology, Mar. 7, 2005.
Statement of ACI-NA and AAAE on Airport Improvement Program Reauthorization before the Senate Aviation Subcommitte on Feb. 12, 1998. David Plavin.
Draft Proposal for the Amendment of the Sub-Cap on Off-Peak Takeoff and Landing Charges At Dublin Airport, Commission for Aviation Regulation, Nov. 23, 2003.
Aviation Infrastructure: Challenges Associated with Building and Maintaining Runways, General Accounting Office, GAO-01-90-T, Oct. 5, 2000.
Airfield Pavement: Keeping Nations Runways in Good Condition Could Require Substantially higher Spending, GAO/RCED-98-226, Jul. 1998.

Albany International Airport Pavement Management System, Albany, New York, Albany International Airport GIS-Based Pavement and Facilities Management, Fall, 2002.

Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.

Micropaver, Dr. M.Y. Shahin, CECER-CFF Champaign, IL May 2, 2005.

Raytheon Systems Limited Launches a Unique Solution for ADS-B, Jan. 19, 2005, Raytheon Corp. http://www.raytheon.co.uk/highlights/ATMS.html.

Raytheon Systems Limited's ADS-B Solution Prized by International Air Traffic Authorities, Feb. 2, 2005, http://www.raytheon.co.uk/news_room/news/press_02022005.pdf.

Boeing Subsidiary and Megadata Announce Joint Marketing Agreement, Press Release, Aug. 7, 2003.

Federal Airways & Airspace, Inc. Because Accuracy Matters, Feb. 2003, Jan. 2002.

VDL3 TM Alignment with DO242A (RTCA ADS-B MASPS) WG51/SG2, NASA, Sep. 2003.

Method to Provide System-Wide ADS-B Back-Up, Validation, and Security, A. Smith et al. 25$^{th}$ AIAA/IEEE Digital Avionics Systems Conference, Oct. 15, 2006.

*Positive Identification of Aircraft on Surface Movement Area—Results of FAA Trials*, 10th Annual International AeroSense Symposium, Orlando, Florida, Apr. 1996.

Surveillance Monitoring of Parallel Percision Approaches in a Free Flight Environment AIAA 16th Annual Digital Avionics Systems Conference, Oct. 1997.

Analysis of ADS-B, ASDE-3 and Multilateration Surveillance Performance—NASA Atlanta Demonstration Presented at the AIAA 17th Annual Digital Avionics Systems Conference in Oct. 1998.

*Application of ADS-B for Airport Surface Surveillance*, Daniel Hicok, Derrick Lee IEEE AIAA 17$^{th}$ Annual Digital Avionics Conference, 1998.

*Atlanta Hartsfield International Airport—Results of FAA Trials to Accurately Locate/Identify Aircraft on the Airport Movement Area.* IEEE Plans. Atlanta, GA. Apr. 1996.

*Evaluation of Airport Surface Surveillance Technologies*, IEEE Radar 96 conference, Beijing, China, Oct. 1996.

*Improved Location/Identification of Aircraft/Ground Vehicles on Airport Movement Areas—Results of FAA Trials*, Institute of Navigation in Santa Monica, CA, Jan. 1996.

Sensis News, http://www.sensis.com/docs/128/ © 1999-2006.

*Roke Radar, Design and development of miniature radars and fuze sensors through to major radar programme builds*, http://www.roke.co.uk/skills/radar/, © 2006.

*Acoustic System for Aircraft Detection and Tracking, based on Passive Microphone Arrays*. Caronna, Rosello, Testa, 148$^{th}$ Meeting of the Acoustical Society of America, http://pcfite.ing.uniroma1.it/upload/research/4psp711079482021710.pdf Nov. 2004.

*Cel-Loc How We Do It, Technology Overview*, http://www.cell-loc.com/how_tech.html, Oct. 2, 2006 (original date unknown).

*Super-Radar, Done Dirt Cheap*, http://www.businessweek.com/magazine/content/03_42/b3854113.htm BusinessWeek Online, Oct. 20, 2003.

*Methods to Provide System-Wide ADS-B Back-Up, Validation and Security*, A. Smith, R. Cassell, T. Breen, R. Hulstrom, C. Evers, 25$^{th}$AIAA/IEEE Digital Avionics Systems Conference, Oct. 15, 2006.

Damarel Systems International, Ltd, Travel Automation Specialists, © 2004, www.dameral.com.

Airfield Pavement Computer Software, Mar. 23, 2005, Transport Canada https://www.tc.gc.ca/CivilAviation/International/Technical/Pavement/software.htm.

ARA Transportation, © 2004, http://www.araworldwide.com/expertise/industry/transportation.htm.

*The Twilight Zone, Can Wide-Area Multilateration Systems Become A Nightmare for MSSR Producers?* Aircraft Traffic Technology International 2005, Vladimir Manda, Viktor Sotona.

*Safety, Performance, and Interoperability Requirements Document for ADS-B NRA Application*, European Organisation for Civil Avaiation Equipment, Dec. 2005.

Passive Surveillance Using Multilateration, Roke Manor Research website (2003).

Letter from Marc Morgan, SIEMENS, Feb. 10, 2006.

*Required Navigation Performance (RNP) and Area Navigation (RNAV)*, Boeing, Aug. 2000.

*System-Wide ADS-B Back-Up and Validation*, A. Smith, R. Cassell, T. Breen, R. Hulstrom, C. Evers, 2006 Integrated Communications, Navigation, and Surveillance Conference.

Required Navigation Performance (RNP) Another step towards global implementation of CNS/ATM, Anita Trotter-Cox, Assessment Compliance Group, Inc. Professional Pilot Magazine, Jun. 1999.

Airport Pavement Management Systems: An Appraisal of Erxisting Methodologies, Michel Gendreau and Patrrick Soriano;Pergamon Transn Res. A, vol. 32, No. 3, pp. 187-214, 1998.

*Components of a Pavement Maintenance Management System*, Mohamed Y. Shahin, U.S. Army Construction Engineering Research Laboratory, Transportation Research Record 791, pp. 31-39, 1980.

*Application of Markov Process to Pavement Mangement Systems at the Network Level*, Abbas Ahmad Butt, University of Iillinois at Urbana-Champaign (1991).

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, 81998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC-186, Aug. 17, 1995, RTCA Paper No. 449-95/SC186-033.

"The Universal Access Transceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program", Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

\* cited by examiner

1. System Today*
2. Selective Availability Off
3. SA Off Plus 30 Satellite Constellation
4. SA Off Plus 2nd Civil Frequency
5. SA Off, 2nd Civil Frequency, 30 Satellite Constellation 1 Signal in Space Error with Selective Availability, 24 Satellite Constellation
  Scheduled and Unscheduled Satellite Downings
  Atmospheric Errors and Multipath
  Reciever Thermal Noise

USE OF GEO-STATIONARY SATELLITES TO AUGMENT WIDE_AREA MULTILATERATION SYNCHRONIZATION

CROSS-REFRENCE TO RELATED APPLICATIONS

The present application is a Continuation-In-Part application of U.S. patent application Ser. No. 10/457,439, filed on Jun. 10, 2003, now U.S. Pat. No. 6,885,340 and incorporated herein by reference in its entirety; U.S. patent application Ser. No. 10/457,439 in turn is a Continuation-In-Part application of U.S. patent application Ser. No. 09/971,672, filed on Oct. 9, 2001, entitled "METHOD AND APPARATUS FOR IMPROVING THE UTILITY OF AUTOMATIC DEPENDENT SURVEILLANCE", now U.S. Pat. No. 6,567,043 which in turn is a Divisional Application of Ser. No. 09/516,215, filed Feb. 29, 2000 entitled "METHOD AND APPARATUS FOR IMPROVING THE UTILITY OF AUTOMATIC DEPENDENT SURVEILLANCE", now U.S. Pat. No. 6,633,259, all of which are incorporated herein by reference in their entirety; U.S. patent application Ser. No. 10/457,439 is also a Continuation-In-Part of U.S. patent application Ser. No. 10/319,725, filed Dec. 16, 2002, entitled "VOICE RECOGNITION LANDING FEE BILLING SYSTEM", now U.S. Pat. No. 6,812,890, and incorporated herein by reference in its entirety; U.S. patent application Ser. No. 10/457,439 also claims priority from Provisional U.S. Patent Application No. 60/440,618, filed Jan. 17, 2003, incorporated herein by reference in its entirety;

The present application is a also Continuation-In-Part application of U.S. patent application Ser. No. 10/743,042, filed on Dec. 23, 2003, now U.S. Pat. No. 7,132,982 and incorporated herein by reference; U.S. patent application Ser. No. 10/743,042 in turn is a Continuation-In-Part application of U.S. patent application Ser. No. 10/638,524, filed Aug. 12, 2003, entitled "METHOD AND APPARATUS FOR IMPROVING THE UTILITY OF AUTOMATIC DEPENDENT SURVEILLANCE", now U.S. Pat. No. 6,806,829, which is incorporated herein by reference in its entirety, which in turn is a Continuation of U.S. patent application Ser. No. 09/516,215, filed on Feb. 29, 2000, now U.S. Pat. No. 6,633,259 which in turn claims priority from Provisional Application Ser. No. 60/123,170, filed Mar. 5, 1999, both of which are incorporated herein by reference in its entirety; U.S. application Ser. No. 10/743,042 is also a Continuation-In-Part of U.S. patent application Ser. No. 10/319,725, filed Dec. 16, 2002, entitled "VOICE RECOGNITION LANDING FEE BILLING SYSTEM", Now U.S. Pat. No. 6,812,890, incorporated herein by reference in its entirety; U.S. application Ser. No. 10/743,042 is also Continuation-In-Part of U.S. patent application Ser. No. 10/457,439, filed Jun. 10, 2003, entitled "Correlation of Flight Track Data with Other Data Sources", incorporated herein by reference in its entirety now U.S. Pat. No. 6,885,340; U.S. application Ser. No. 10/743,042 also claims priority from Provisional U.S. Patent Application No. 60/440,618, filed Jan. 17, 2003, incorporated herein by reference in its entirety;

The present application is also a Continuation-In-Part application of U.S. patent application Ser. No. 11/031,457, filed on Jan. 7, 2005, and incorporated herein by reference, which in turn is a Continuation-In-Part application of U.S. patent application Ser. No. 10/638,524, filed Aug. 12, 2003, entitled "METHOD AND APPARATUS FOR IMPROVING THE UTILITY OF AUTOMATIC DEPENDENT SURVEILLANCE", now U.S. Pat. No. 6,806,829, which is incorporated herein by reference in its entirety, which in turn is a Continuation of U.S. patent application Ser. No. 09/516,215, filed on Feb. 29, 2000 now U.S. Pat. No. 6,633,259, which in turn claims priority from Provisional Application Ser. No. 60/123,170, filed Mar. 5, 1999, all of which are incorporated herein by reference in its entirety; application Ser. No. 11/031,457 is also a Continuation-In-Part of U.S. patent application Ser. No. 10/319,725, filed Dec. 16, 2002, entitled "VOICE RECOGNITION LANDING FEE BILLING SYSTEM", now U.S. Pat. No. 6,812,890, incorporated herein by reference in its entirety; application Ser. No. 11/031,457 is also a Continuation-In-Part of U.S. patent application Ser. No. 10/457,439, filed Jun. 10, 2003 entitled "Correlation of Flight Track Data with Other Data Source", now U.S. Pat. No. 6,885,340 incorporated herein by reference in its entirety; application Ser. No. 11/031,457 also claims priority from Provisional U.S. patent application Ser. No. 60/440,618, filed Jan. 17, 2003, incorporated herein by reference in its entirety;

The present application is also a Continuation-In-Part application of U.S. patent application Ser. No. 10/756,799 filed Jan. 14, 2004, and incorporated herein by reference; application Ser. No. 10/756,799 is a Continuation-In-Part application of U.S. patent application Ser. No. 10/638,524, filed Aug. 12, 2003, now U.S. Pat. No. 6,806,829 entitled "METHOD AND APPARATUS FOR IMPROVING THE UTILITY OF AUTOMATIC DEPENDENT SURVEILLANCE", which is incorporated herein by reference in its entirety, which in turn is a Continuation of U.S. patent application Ser. No. 09/516,215, filed on Feb. 29, 2000, which in turn claims priority from Provisional Application Ser. No. 60/123,170, filed Mar. 5, 1999, both of which are incorporated herein by reference in their entirety; application Ser. No. 10/756,799 is also a Continuation-In-Part of U.S. patent application Ser. No. 10/319,725, filed Dec. 16, 2002, now U.S. Pat. No. 6,812,890 entitled "VOICE RECOGNITION LANDING FEE BILLING SYSTEM", incorporated herein by reference in its entirety, which in turn claims priority from Provisional U.S. Patent No. 60/343,237, filed Dec. 31, 2001, also incorporated by reference in its entirety; application Ser. No. 10/756,799 is also a Continuation-In-Part of U.S. patent application Ser. No. 10/457,439, filed Jun. 10, 2003 now U.S. Pat. No. 6,885,340 entitled "Correlation of Flight Track Data with Other Data Source", incorporated herein by reference in its entirety; application Ser. No. 10/756,799 is also a Continuation-In-Part of U.S. patent application Ser. No. 10/751,118, filed on Jan. 5, 2004, now abandoned entitled "Method and Apparatus to Correlate Aircraft Flight Tracks and Events with Relevant Airport Operations Information" which in turn claims priority from Provisional U.S. Patent Application Ser. No. 60/440,618, filed Jan. 17, 2003, incorporated herein by reference in its entirety; application Ser. No. 10/756,799 also claims priority from Provisional U.S. Patent Application Ser. No. 60/440,618, filed Jan. 17, 2003, incorporated herein by reference in its entirety; application Ser. No. 10/756,799 is also a Continuation-In-Part of U.S. patent application Ser. No. 10/743,042, filed Dec. 23, 2003 now U.S. Pat. No. 7,132,982 entitled "METHOD AND APPARATUS FOR ACCURATE AIRCRAFT AND VEHICLE TRACKING" (Alexander E. Smith et al.), incorporated herein by reference; application Ser. No. 10/756,799 also claims priority from Provisional U.S. Patent Application Ser. No. 60/534,706, filed Jan. 8, 2004, incorporated herein by reference in its entirety;

The present application is a Continuation-In-Part application of U.S. patent application Ser. No. 10/830,444, filed on Apr. 23, 2004, and incorporated herein by reference; U.S. patent application Ser. No. 10/830,444 is a DIVISIONAL application of U.S. patent application Ser. No. 10/457,439, filed on Jun. 10, 2003, and incorporated herein by reference; U.S. patent application Ser. No. 10/457,439 in turn was a Continuation-In-Part application of U.S. patent application Ser. No. 09/516,215, filed Feb. 29, 2000, entitled "METHOD AND APPARATUS FOR IMPROVING THE UTILITY OF AUTOMATIC DEPENDENT SURVEILLANCE", Now U.S. Pat. No. 6,633,259, which is incorporated herein by reference in its entirety; U.S. patent application Ser. No. 10/457,439 was also a Continuation-In-Part of U.S. patent application Ser. No. 10/319,725, filed Dec. 16, 2002, entitled "VOICE RECOGNITION LANDING FEE BILLING SYSTEM", incorporated herein by reference in its entirety. U.S. patent application Ser. No. 10/457,439 also claims priority from Provisional U.S. Patent Application No. 60/440,618, filed Jan. 17, 2003, incorporated herein by reference in its entirety;

The present application is also Continuation-In-Part of U.S. patent application Ser. No. 11/111,957, filed on Apr. 22, 2005, and incorporated herein by reference;

The present application is also a Continuation-In-Part of U.S. patent application Ser. No. 11/145,170, filed on Jun. 6, 2005, and incorporated herein by reference;

The present application is also a Continuation-In-Part of U.S. patent application Ser. No. 11/203,823, filed on Aug. 15, 2005, and incorporated herein by reference;

The present application is also a Continuation-In-Part of U.S. patent application Ser. No. 11/257,416, filed on Oct. 24, 2005, incorporated herein by reference;

The present application is also a Continuation-In-Part of U.S. patent application Ser. No. 11/209,030, filed on Aug. 22, 2005, and incorporated herein by reference.

The subject matter of the present application is related to the following issued U.S. Patents, assigned to the same assignee as the present invention, all of which are incorporated herein by reference in their entirety:

U.S. Pat. No. 5,999,116, issued Dec. 7, 1999, entitled "Method and Apparatus for Improving the Surveillance Coverage and Target Identification in a Radar Based Surveillance System";

U.S. Pat. No. 6,094,169, issued Jul. 25, 2000, entitled "Passive Multilateration Auto-Calibration and Position Error Correction";

U.S. Pat. No. 6,211,811, issued Apr. 2, 2001, entitled "Method and Apparatus for Improving the Surveillance Coverage and Target Identification in a Radar Based Surveillance System";

U.S. Pat. No. 6,384,783, issued on May 7, 2002, entitled "Method and Apparatus for Correlating Flight Identification Data With Secondary Surveillance Radar Data";

U.S. Pat. No. 6,448,929, issued Sep. 10, 2002, entitled "Method and Apparatus for Correlating Flight Identification Data With Secondary Surveillance Radar Data";

U.S. Pat. No. 6,567,043, issued May 20, 2003, entitled "METHOD AND APPARATUS FOR IMPROVING THE UTILITY OF AUTOMATIC DEPENDENT SURVEILLANCE";

U.S. Pat. No. 6,633,259 issued Oct. 14, 2003 "METHOD AND APPARATUS FOR IMPROVING THE UTILITY OF AUTOMATIC DEPENDENT SURVEILLANCE";

U.S. Pat. No. 6,806,829, issued Oct. 19, 2004, entitled "METHOD AND APPARATUS FOR IMPROVING THE UTILITY OF AUTOMATIC DEPENDENT SURVEILLANCE";

U.S. Pat. No. 6,812,890, issued Nov. 2, 2004, entitled "VOICE RECOGNITION LANDING FEE BILLING SYSTEM"; and U.S. Pat. No. 6,885,340, issued Apr. 26, 2005, entitled "CORRELATION OF FLIGHT TRACK DATA WITH OTHER DATA SOURCES".

FIELD OF THE INVENTION

The present invention relates to the use of multilateration for tracking vehicles, in particular, aircraft. In particular, the present invention relates to the use of geo-stationary satellites and terrestrial transmitters to augment wide area multilateration time synchronization.

BACKGROUND OF THE INVENTION

In the past few years multilateration has become popular for many aircraft air traffic control applications. Initially introduced for airport surface tracking to prevent runway incursions, the benefits of multilateration have extended to terminal and wide areas. Wide area multilateration (WAMLAT) is viewed as a transition and potential back up to Automatic Dependent Surveillance Broadcast (ADS-B). Since WAMLAT techniques include satellite-based timing, and ADS-B uses satellite navigation, the impact of satellite common mode failures needs to be assessed for combined ADS-B and back up applications. This following is a summary of the availability of timing data from satellite navigation systems and proposes techniques to improve overall availability of WAMLAT.

There are a number of wide Area Multilateration Satellite Synchronization Techniques in the Prior Art. Eurocontrol Report EATMP TRS 131/04, Wide Area Multilateration, Version 1.0, November 2004, by W. H. L. Neven, T. J. Quilter, R. Weedon, and R. A. Hogendoorn, incorporated herein by reference, assessed the various synchronization methods used for WAMLAT. Four methods were evaluated—common clock, reference transponder, and two satellite techniques using standard GNSS processing as well as common view GNSS processing, which is essentially an over-determined solution for timing.

FIG. 1 is a diagram illustrating Standard GNSS Synchronization. Referring to FIG. 1, satellite constellation generates GPS timing signals, which are received by antennas 115, 135, which feed corresponding GNSS receivers 110, 130 at respective multilateration tracking stations. Each multilateration tracking station also has a corresponding down converter 120, 140, for receiving aircraft or other vehicle radio signals. GNSS receivers 110 and 130 feed local clocks 150 and 170 which in turn are used as time sources for time of arrival measurement units 150 and 180, which time stamp the received radio signals from down converters 120, 140, respectively. Through digital links, the time-stamp data is fed to a time difference of arrival (TDOA) and tracking unit 190 where vehicle position can be determined.

FIG. 2 is a diagram illustrating Common View GNSS Synchronization. Referring to FIG. 2, satellite constellation generates GPS timing signals, which are received by antennas 215, 235, which feed corresponding GNSS receivers 210, 230 at respective multilateration tracking stations. Each multilateration tracking station also has a corresponding down converter 220, 240, for receiving aircraft or other vehicle radio signals. GNSS receivers 210 and 230 feed local clocks 250 and 270 which in turn are used as time sources for time of arrival measurement units 250 and 280, which time stamp the received radio signals from down converters 220, 240, respectively. Through digital links, time data is fed from GNSS receivers 210 and 230 directly to processor 295, which corrects timing data, while the time-stamp data is fed to a time difference of arrival (TDOA) and tracking unit 290 where vehicle position can be determined.

There are other satellite based timing techniques that the Eurocontrol study did not evaluate, such as relative timing as presented in U.S. Pat. No. 6,049,304, method and apparatus for improving the accuracy of relative position estimates in a satellite-based navigation system, incorporated herein by reference. The relative timing solution technique results in higher timing accuracy by eliminating errors affecting multiple receivers in the same geographic region. In this approach, the standard absolute navigation equations are modified to solve directly for relative position and timing, thereby providing increased precision.

Wide Area Multilateration has been used to validate ADS-B. While ADS-B promises global accurate tracking of aircraft using a significantly lower-cost surveillance infrastructure than today's conventional radar surveillance, there are issues regarding availability and spoofing. WAMLAT is widely viewed as a potential back up/validation to ADS-B. The Eurocontrol report concluded that WAMLAT could be used in the following roles.

To verify navigation accuracy, ADS-B data can be checked against the multilateration data to verify the track keeping performance of the avionics. ADS-B may also be used for Integrity Monitoring. WAMLAT can be used to monitor the integrity of ADS-B as a surveillance technique. This may be done to gather data for a safety case and to monitor the integrity of in-service systems. For example, a bias in one aircrafts position is a serious safety issue for ADS-B only surveillance but a WAMLAT system could identify this immediately. For Anti-spoofing, WAMLAT systems can be used to identify genuine aircraft and the source of spoof transmissions. However, since both ADS-B and WAMLAT depend on satellite information, the impact of satellite common mode failures should be assessed.

Satellite availability is another issue affecting the use of GPS in wide-area multilateration. In the GPS standard positioning service signal specification, 2nd Edition, dated 1995, and incorporated herein by reference, the minimum coverage availability, which is the probability of four or more satellites in view over any 24-hour interval, averaged over the entire globe is $\geq 0.999$. In a paper titled *Weight RAIM for Precision Approach* by Per Enge of Stanford University presented at the 1995 ION GPS Conference and incorporated herein by reference, he concluded that P(N$\geq$4) was 0.99996. This result was based on simulation using realistic satellite failure models over 107 simulated geometries.

These results relate to four satellites in view to provide navigation. However, WAMLAT does not need the navigation mode for operation, as the necessary function is timing or relative time measurements between the sensors. Since WAMLAT sensors are stationary, with accurately known positions, solutions using four or fewer satellites are sufficient for time/relative time measurement. In a paper published at the 1999 ION National Technical Meeting, and incorporated herein by reference, Boeing's Clifford Kelley summarized the historical availability of GPS satellites from 1995-1999 as illustrated in Table 1.

TABLE 1

| Number of Operational Satellites | Availability |
| --- | --- |
| $\leq 21$ | 1.0 |
| 22 | 0.9992 |
| 23 | 0.9475 |

Therefore, at any time, there are 21 or more operational satellites making up the constellation from which users need to have four in view for navigation. For the purpose of quantification, the timing availability for AirScene™ using GPS is expected to be significantly better than the requirements for navigation and is concluded to be $\geq 0.99999$. This is considered to be a conservative value and drives the overall system availability.

The United States has implemented a Wide Area Augmentation System (WAAS). An excellent description of WAAS may be found on Mehaffy, Yeazel, and DePriest's GPS information website, http://www.gpsinformation.org/dale/dgps.htm, incorporated herein by reference. WAAS is a method of providing better accuracy from the GPS constellation and it similar in principle to DGPS except that a second receiver is not required. Correction data is sent via geo-stationary satellites (GEO) and is decoded by one of the regular channels already present in the GPS receiver. Thus one of the channels can be designated to decode regular GPS signals or can be used to decode WAAS data. Regional correction data is collected by a set of ground stations all over the United States. The data is packaged together, analyzed, converted to a set of correction data by a master station and then uploaded to the GEOs, which in turn transmit the data down to the local GPS receiver. The GPS receiver then figures out which data is applicable to its current location and applies appropriate corrections to the receiver. Importantly, the GEOs also function as independent GPS satellites and therefore provide another source of timing. FIG. 3 illustrates a WAAS Ground Station Layout.

As of 2006, the WAAS system is operational and there are near-real-time updates on system performance posted on the internet such as the non precision approach coverage from http://www.nstb.tc.faa.gov/npa.html, incorporated herein by reference. For non-precision approach accuracy a DOP of up to four may be used. FIG. 4 illustrates a near real time display of non precision approach accuracy.

The *GPS Risk Assessment Report*, VS-99-007, January 1999, Johns Hopkins University, incorporated herein by reference, evaluated the improvements in availability provided by various GEO augmentation scenarios. FIGS. 5, 6, and 7 illustrate the use of GPS for various navigation applications, with no GEO augmentation, with GEO augmentation, and with GEO augmentation and assumptions regarding mean time to repair (MTTR). FIG. 5 is a chart illustrating GPS Availability without Augmentation. FIG. 6 is a chart illustrating GPS Availability with Augmentation. FIG. 7 is a chart illustrating GPS Availability with Augmentation and MTTR Assumptions.

Generally, for en-route and terminal navigation applications, navigation availability improves by a factor of 100 or so when four GEOs are used. Navigation availability requirements of 0.99999 are exceeded by at least one order using four GEOs.

Similar wide area correction systems exist in other parts of the world, such as the European EGNS (http://www.e-sa.int/esaNA/index.html) and the Japanese MTSAT, both of which are incorporated herein by reference. The European ground station network (from http://www.gpsinformation.org/dale/dgps.htm, incorporated herein by reference) is illustrated in FIG. 8. FIG. 8 is a map illustrating European EGNOS Station Locations.

Each correction system, using geostationary satellites, provides higher availability and integrity than un-augmented satellite systems such as GPS or Galileo. FIG. 9 summarizes the overlay provided by each system. Note that the footprints shown are constrained by the location of wide area ground stations, and the GEOs, complete with additional timing information, cover a far broader area. FIG. 9 is a map illustrating WAAS, EGNOS, and MSAS Ground Station Coverage Areas.

SUMMARY OF THE INVENTION

The present invention improves WAMLAT Timing Availability by using timing from one or more of a variety of sources. These sources include unaugmented SATNAV timing, from GPS or/and GALILEO, GEO timing from pseudo SATNAV signals, additional GEO timing for non SATNAV applications, timing signals from analog and digital television and radio transmitters, and stable on board oscillators to withstand short term interruptions in satellite timing. The use of one or more of these multiple sources of timing improves the accuracy and reliability of wide area multilateration systems.

DETAILED DESCRIPTION OF THE INVENTION

Figure 1:
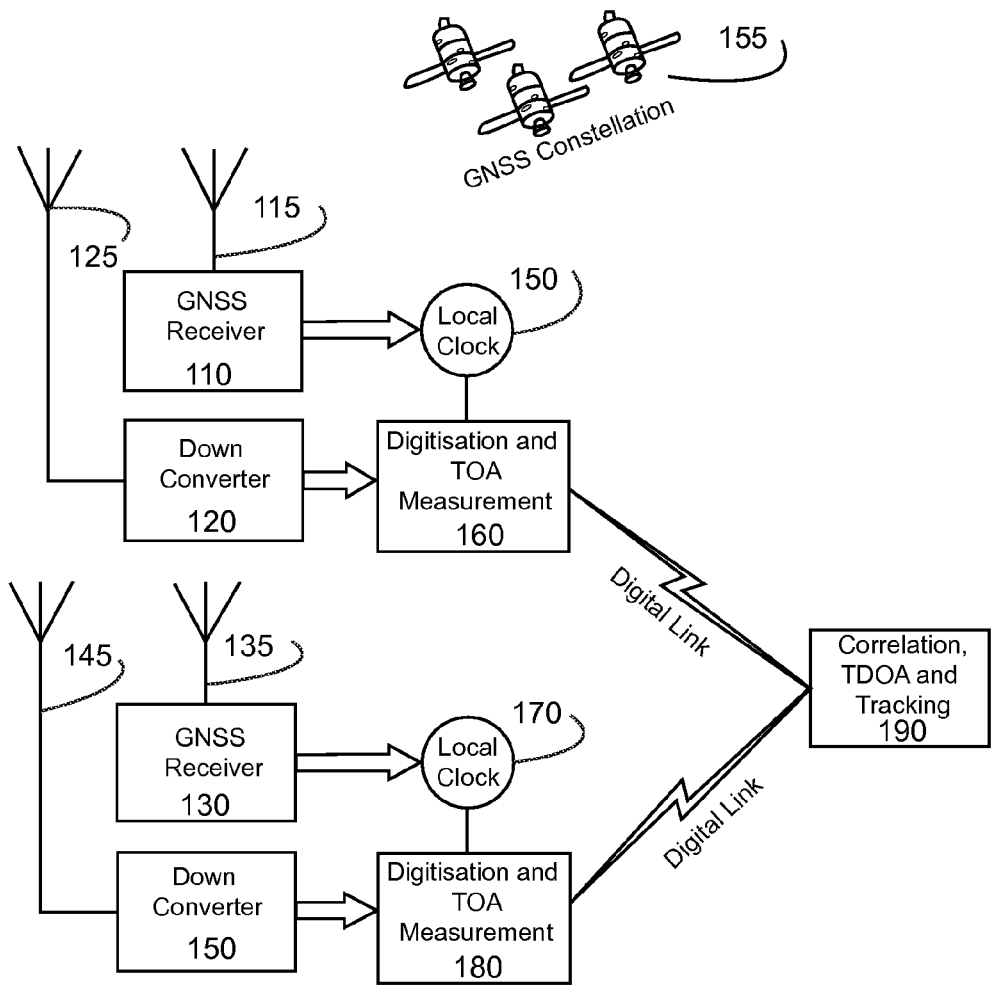
FIG. 1 diagram illustrating Standard GNSS Synchronization.
Figure 2:
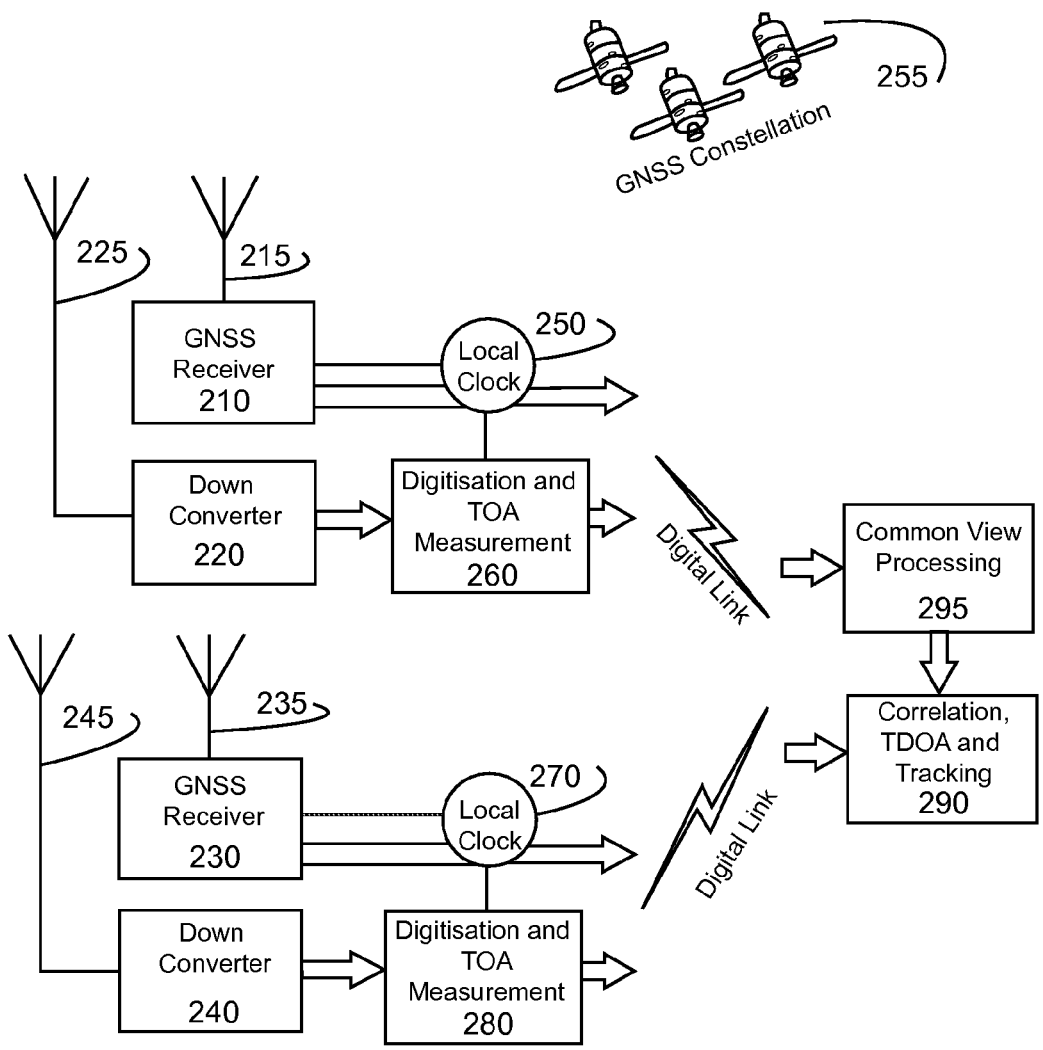
FIG. 2 is a diagram illustrating Common View GNSS Synchronization.
Figure 3:
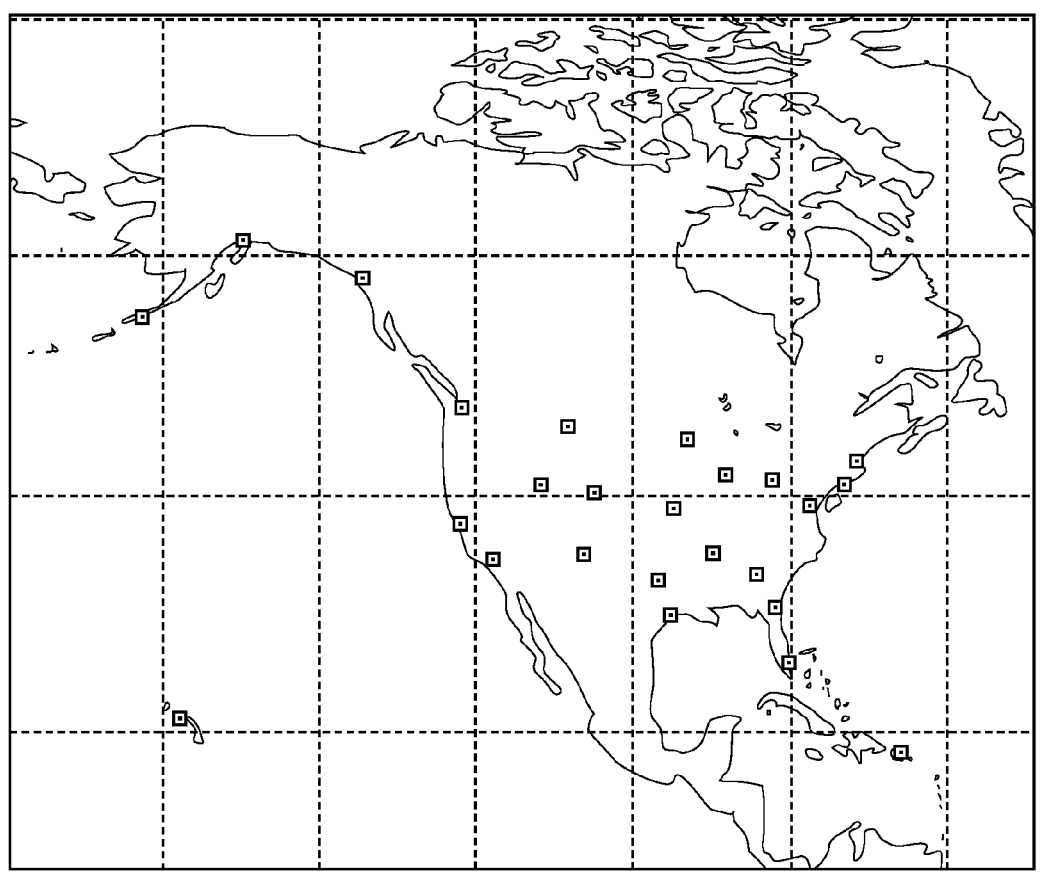
FIG. 3 illustrates a WAAS Ground Station Layout.
Figure 4:
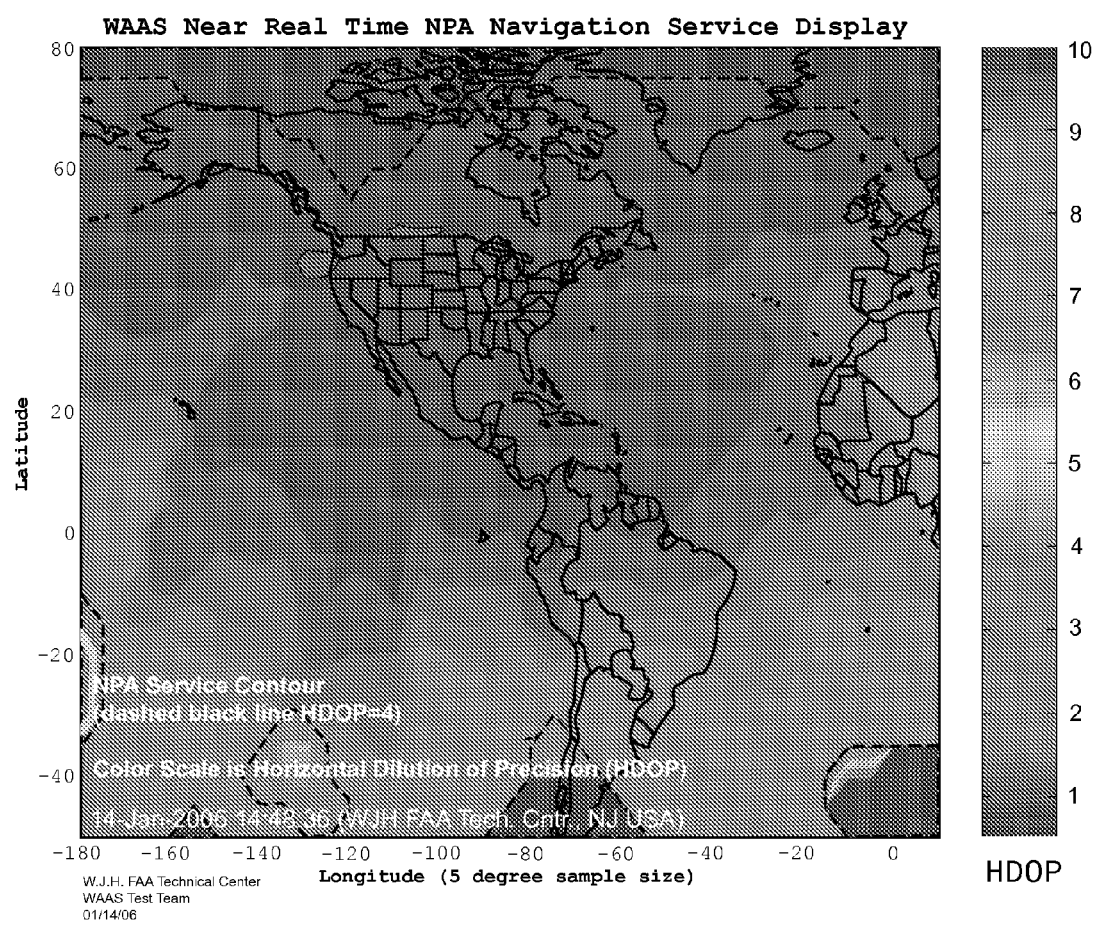
FIG. 4 illustrates a Near Real Time Display of Non Precision Approach Accuracy.
Figure 5:
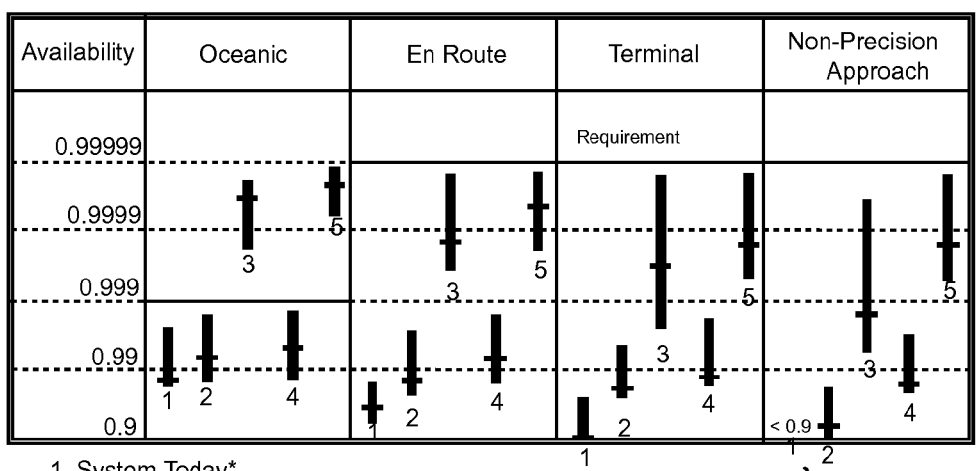
FIG. 5 is a chart illustrating GPS Availability without Augmentation.
Figure 5:
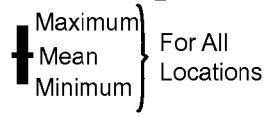
Figure 6:
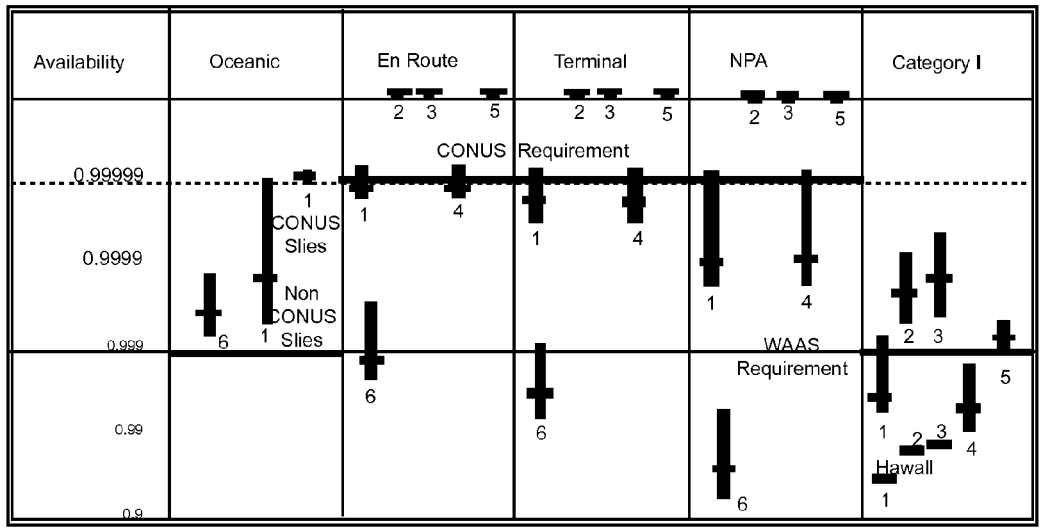
FIG. 6 is a chart illustrating GPS Availability with Augmentation.
Figure 7:
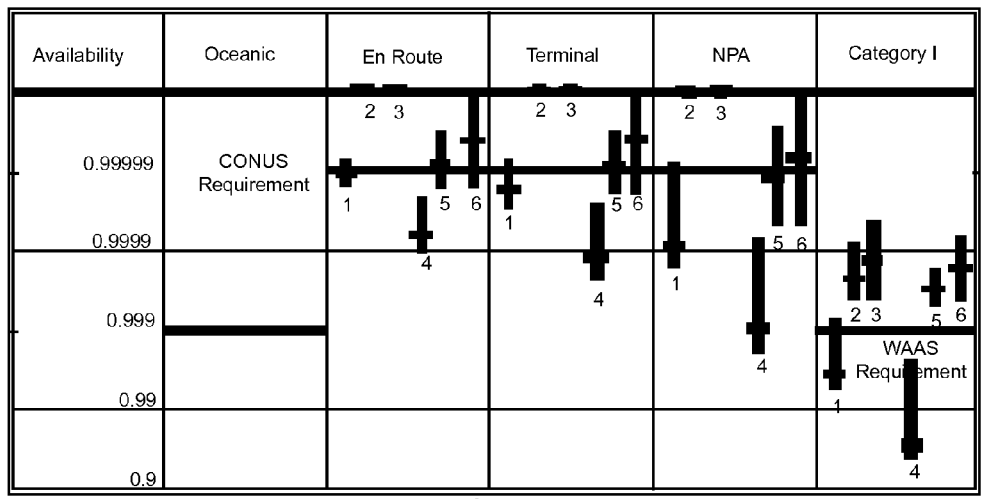
FIG. 7 is a chart illustrating GPS Availability with Augmentation and MTTR Assumptions.
Figure 8:
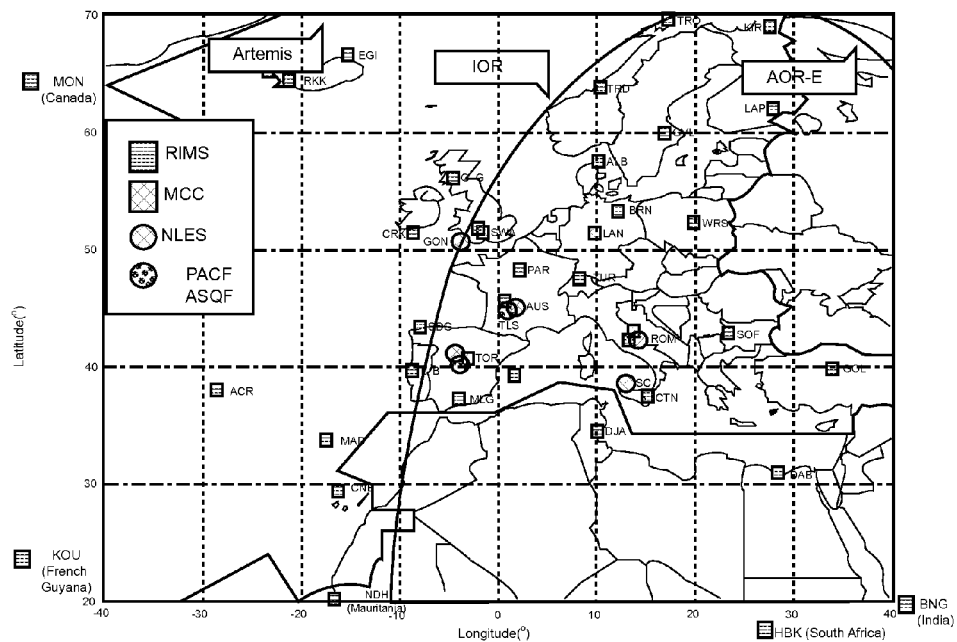
FIG. 8 is a map illustrating European EGNOS Station Locations.
Figure 9:
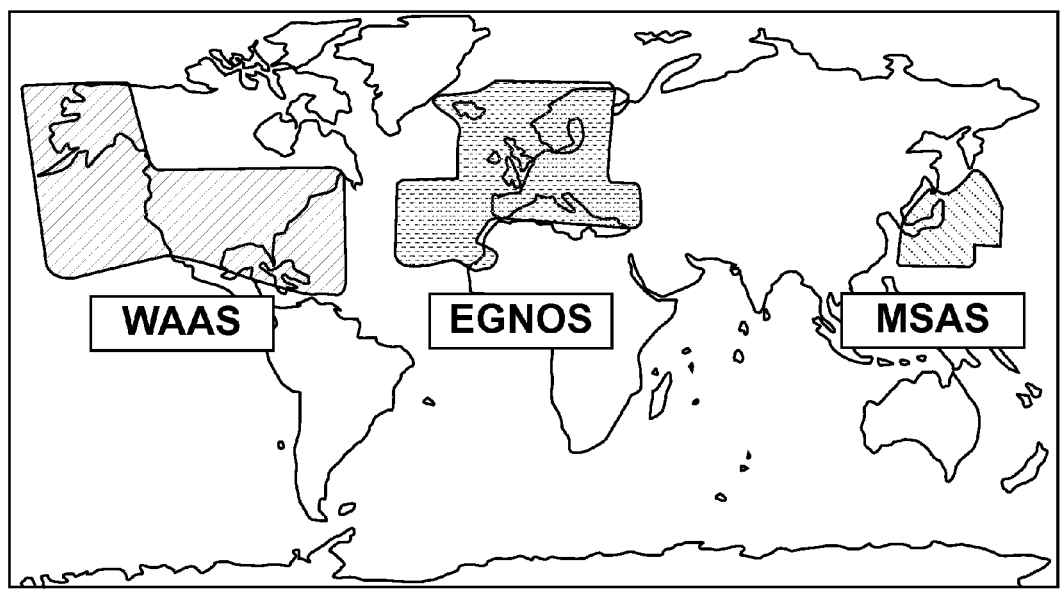
FIG. 9 is a map illustrating WAAS, EGNOS, and MSAS Ground Station Coverage Areas.
Figure 10:
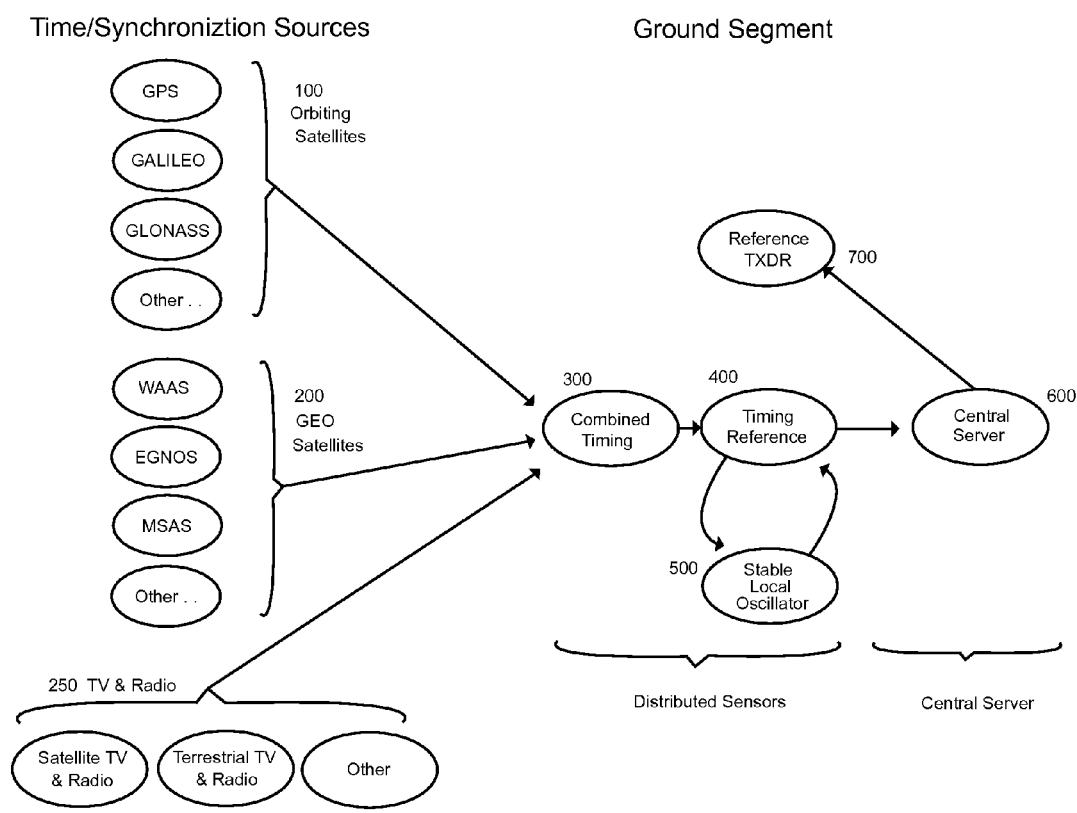
FIG. 10 is a block diagram illustrating one embodiment of the present invention with both a space segment and a ground segment.

FIG. 10 is a block diagram illustrating one embodiment of the present invention with a space segment and a ground segment. Orbiting satellites 100 shown to include the U.S. GPS, the European GALILEO, the Russian GLONASS, and other orbiting satellite-based navigation and television and radio broadcast systems. The GEO timing is shown 200 from the U.S. WAAS system, the European EGNOS system, the Japanese MSAS system, and other overlays and GEO services. Similarly, both terrestrial and satellite-based television and radio transmitters 250 shown to include the U.S. ATSC system, European DVB system, and Japanese ISDB as well as the XM, Sirius, Worldspace, and DAB radio systems, will also provide time synchronization information.

In this embodiment, all the timing sources are combined to give a best estimate of synchronization at sensor 300. Note that it is possible to combine the orbiting and GEO timing information in different ways. For example, depending on preference a preferred source may be used with the others as secondary, e.g., in the United States GPS may be used as primary, with GALILEO as secondary, using the available GEO overlay or terrestrial sources as a back up. Alternatively, a voting technique, or overall combination method may be employed.

The resulting timing from 300 is then used to synchronize the sensor's clock 400, which may be used as the master timing reference for the sensor.

In the event of temporary local satellite denial of service at the sensor, e.g., jamming, a highly stable local clock 500, combined with the television and radio signal timing 250, may be used in the absence of any satellite timing information.

Using the master timing reference, time-stamped aircraft transponder signals are then sent to the central server location 600.

In this embodiment, the use of a local, terrestrial reference transponder is also shown 700 which may use 1090 MHz, satellite frequencies (pseudolite), or other frequencies high enough to transmit a suitable synchronization signal.

In a different embodiment, the timing derivation 300 may be performed at the central server 600. This would essentially extend the common view approach described earlier.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A tracking apparatus, comprising:
    a satellite receiver for receiving, from at least one satellite, at least one timing source,
    at least one of a television receiver for receiving television signals from a plurality of stationary transmitters or satellites for timing purposes and a broadcast radio receiver for receiving radio signals from a plurality of stationary transmitters or satellites for timing purposes,
    at least one radio receiver for receiving from a vehicle, a radio signal at a plurality of radio receiver locations,
    at least one time-stamp generator, each at a corresponding at least one radio receiver, for timer-stamping the received radio signal with a time-stamp derived at least in part from the at least one timing source, and
    a tracking computer for determining a position of a radio signal source from the time difference of arrival of the radio signal time stamps.

2. The apparatus of claim 1, wherein at least one of the at least one satellite is a geostationary navigation satellite.

3. The apparatus of claim 1, wherein at least one of the at least one satellite is a commercial, non navigation geostationary satellite.

4. The apparatus of claim 1, wherein the at least one satellite includes at least one standard navigation satellite, and at least one geostationary satellite, wherein the timing source comprises timing sources provided from the at least one standard navigation satellite and the at least one geostationary satellite.

5. The apparatus of claim 1, wherein said time-stamp generator time-stamps the received radio signal with a time-stamp derived from the at least one timing source further supplemented by highly stable local clocks at each of the plurality of receiver locations.

6. The apparatus of claim 5, wherein said time-stamp generator time-stamps the received radio signal with a time-stamp derived from the at least one timing source further supplemented by highly stable local clocks and synchronization data from a plurality of television and radio transmitters at each of the plurality of receiver locations.

7. The apparatus of claim 1, wherein the at least one satellite comprises one or more of WAAS, EGNOS, MSAS satellites, wherein the time-stamp is derived from timing from one or more of WAAS, EGNOS, MSAS satellites.

8. The apparatus of claim 1, wherein the at least one satellite comprises one or more of WAAS, EGNOS, MSAS satellites, wherein the time-stamp is enhanced by timing from one or more of WAAS, EGNOS, MSAS satellites.

9. The apparatus of claim 1, wherein the at least one satellite comprises an orbiting satellite and GEO satellite, and wherein the time stamp is derived from orbiting satellite timing and GEO satellite timing, local timing, and reference transponder timing.

10. The apparatus of claim 1, wherein the time stamp is derived by using GEO satellite timing to enhance and extend local and reference transponder timing.

11. The apparatus of claim 1 wherein at least one television transmitter comprises at least one of an ATSC, DVB, or ISDB system, and wherein the time stamp is generated from the signals generated by these transmitters.

12. The apparatus of claim 1 wherein at least one broadcast radio transmitter comprises at least one of a XM, Sirius, or DAB system, and wherein the time stamp is generated from the signals generated by these transmitters.

* * * * *